Patented Dec. 6, 1927.

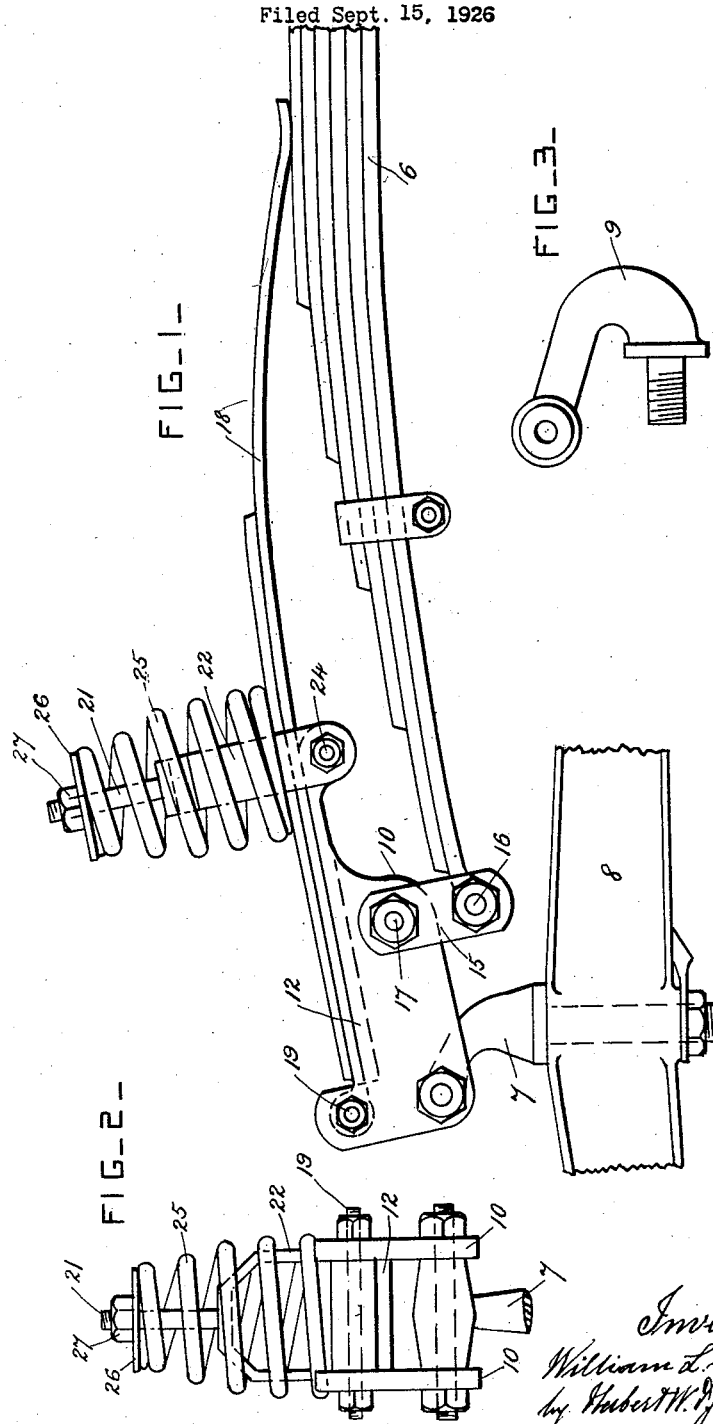

1,651,373

UNITED STATES PATENT OFFICE.

WILLIAM L. CHAMBERS, OF OGDEN, UTAH.

SHOCK ABSORBER.

Application filed September 15, 1926. Serial No. 135,632.

This invention relates to means for absorbing the shocks of the springs which support the body portions of motor cars, and more particularly the springs used on Ford cars; and it consists in the novel construction and combination of the parts hereinafter fully described and claimed.

In the drawings, Figure 1 is a side view of the end portion of a spring used on the front end of a Ford car, provided with a shock absorber according to this invention. Fig. 2 is an end view of the shock absorber shown in Fig. 1. Fig. 3 is a side view of the anchor bolt of the spring when used on the rear end of a Ford car.

The leaf spring 6 is that ordinarily used on the front end of a Ford car, and which is ordinarily pivoted to a similar anchor bolt 7 at each end. These anchor bolts 7 are secured to the front axle 8, a portion of which is shown. When the leaf spring 6 is applied to the rear end of a Ford motor car, anchor bolts 9 are used for holding the spring in position. These same anchor bolts are used in connection with this invention, but the form of anchor bolt is not material, and anchor bolts of any suitable form can be used.

In carrying out the present invention the leaf spring 6 is not pivoted directly to the anchor bolt, but is pivoted to the lower part of the forked end portion 10 of a bracket 12 which is pivoted to the anchor bolt. The end of the leaf spring 6 is pivoted to the lower ends of links 15 by a pin 16, and the upper ends of the links straddle the bracket 12 and are pivoted to it by a pin 17.

The shock absorber is provided with an auxiliary leaf spring 18, one end portion of which is pivoted above the anchor bolt to the upper part of the forked end portion 10 of the bracket 12 by a pin 19. The leaf spring 18 bears on the top of the bracket 12, and its free end portion 20 projects over and bears on the upper leaf of the main leaf spring 6. A bolt 21 is provided, and has a forked lower end portion 22 which straddles the leaf spring 18 and is pivoted to the other end portion of the bracket 12 from the pin 19, by a pin 24.

A helical spring 25 encircles the bolt 21 and its forked end portion, and bears on the leaf spring 18. A plate 26 is arranged on the bolt 21 above the helical spring, and a nut 27 is screwed on the bolt above the plate 26, and is used to adjust the strength of the helical spring so as to absorb all the shocks which would otherwise be transmitted in driving over a rough road, if the springs 18 and 25 and the bracket 12 and links 15 were not provided.

What I claim is:

1. The combination, with an anchor bolt, and a main leaf spring, of a shock absorber for the main leaf spring comprising a bracket pivoted to the anchor bolt, an auxiliary leaf spring pivoted at one end to the bracket above the anchor bolt and bearing on the main spring at its other end and bearing on the bracket between its ends, means for pivotally connecting the main leaf spring with the said bracket, and a helical spring bearing on the auxiliary leaf spring and provided with means for pressing its free end portion downwardly on the main leaf spring, the said means for connecting the main spring with the bracket being arranged between the pivot of the anchor bolt and the helical spring.

2. The combination, with an anchor bolt, and a main leaf spring, of a shock absorber for the main leaf spring comprising a bracket pivoted to the anchor bolt, an auxiliary leaf spring pivoted at one end to the bracket above the anchor bolt and bearing on the main spring at its other end and bearing on the bracket between its ends, means for pivotally connecting the main leaf spring with the said bracket, a bolt provided with a forked end portion which straddles the auxiliary leaf spring and is pivoted to the other end portion of the bracket from the said spring, an adjustable plate on the said bolt, and a helical spring interposed between the said plate and auxiliary leaf spring and encircling the said bolt, the said means for connecting the main spring with the bracket being arranged between the pivot of the anchor bolt and the pivot of the forked end of the bolt of the helical spring.

3. The combination, with an anchor bolt, and a main leaf spring, of a bracket pivoted to the anchor bolt, an auxiliary leaf spring bearing between its ends on the said bracket and having one end pivoted to one end of the bracket above the anchor bolt and its other end arranged to bear downwardly on the main leaf spring, a spring arranged above the other end of the bracket and pressing the auxiliary leaf spring downwardly, and means for pivotally connecting the main leaf spring with the bracket between the last said spring and the anchor bolt.

In testimony whereof I have affixed my signature.

WILLIAM L. CHAMBERS.